Sept. 24, 1935.  G. FOX ET AL  2,015,263
STOCK LINE RECORDER
Filed Sept. 24, 1928   3 Sheets-Sheet 1
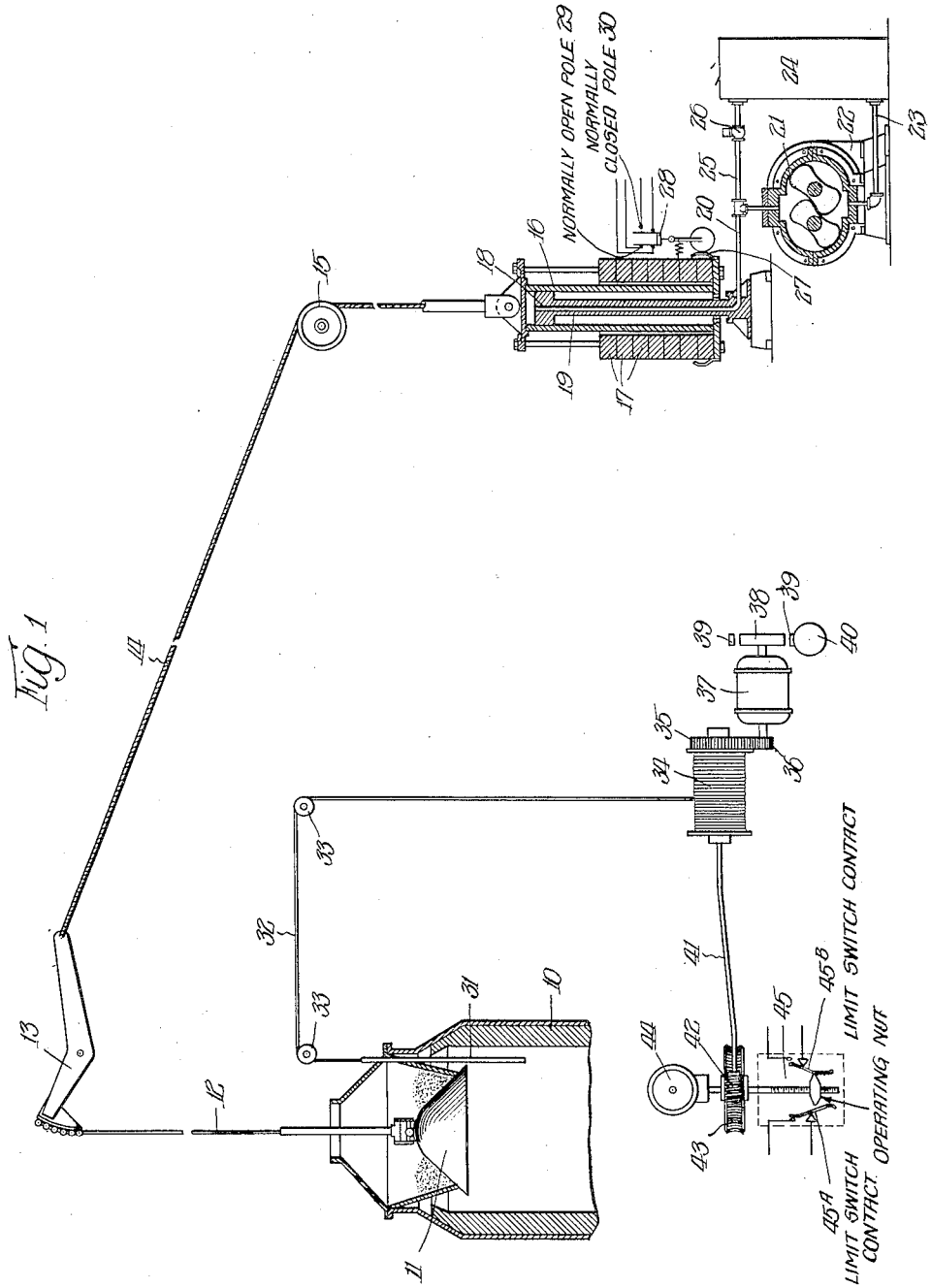
Inventors:
Gordon Fox,
Arthur J. Whitcomb,

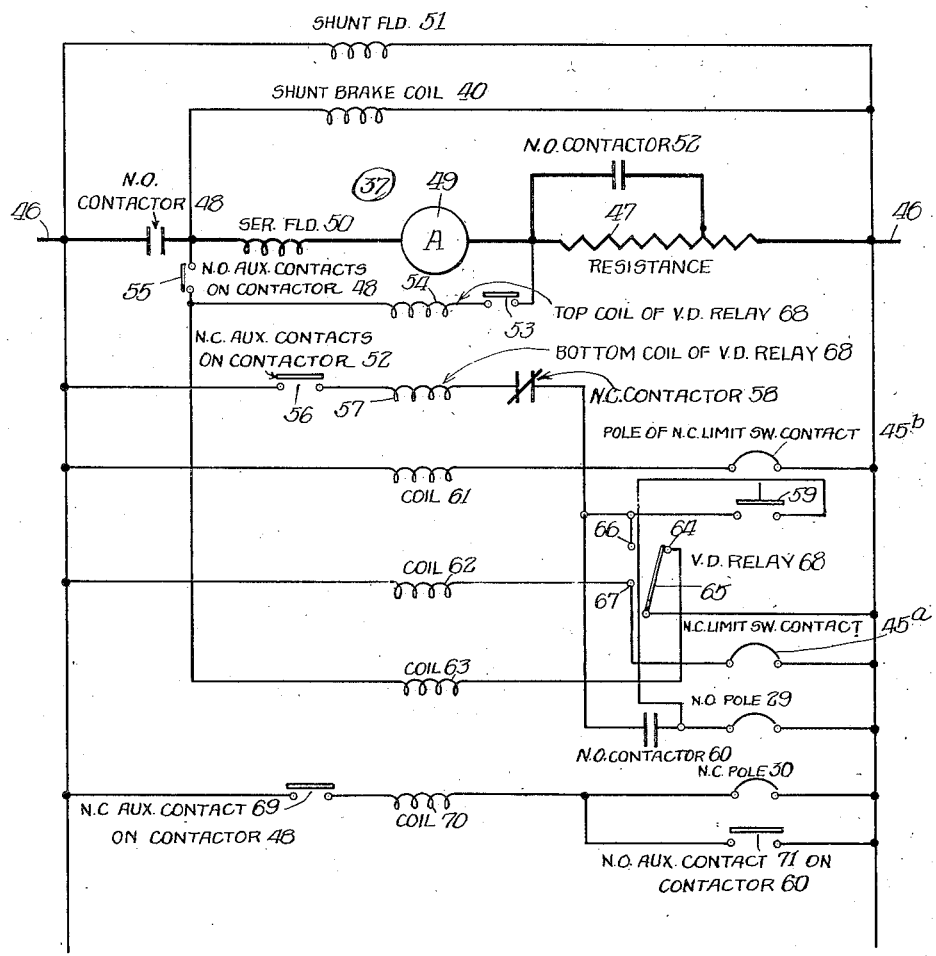

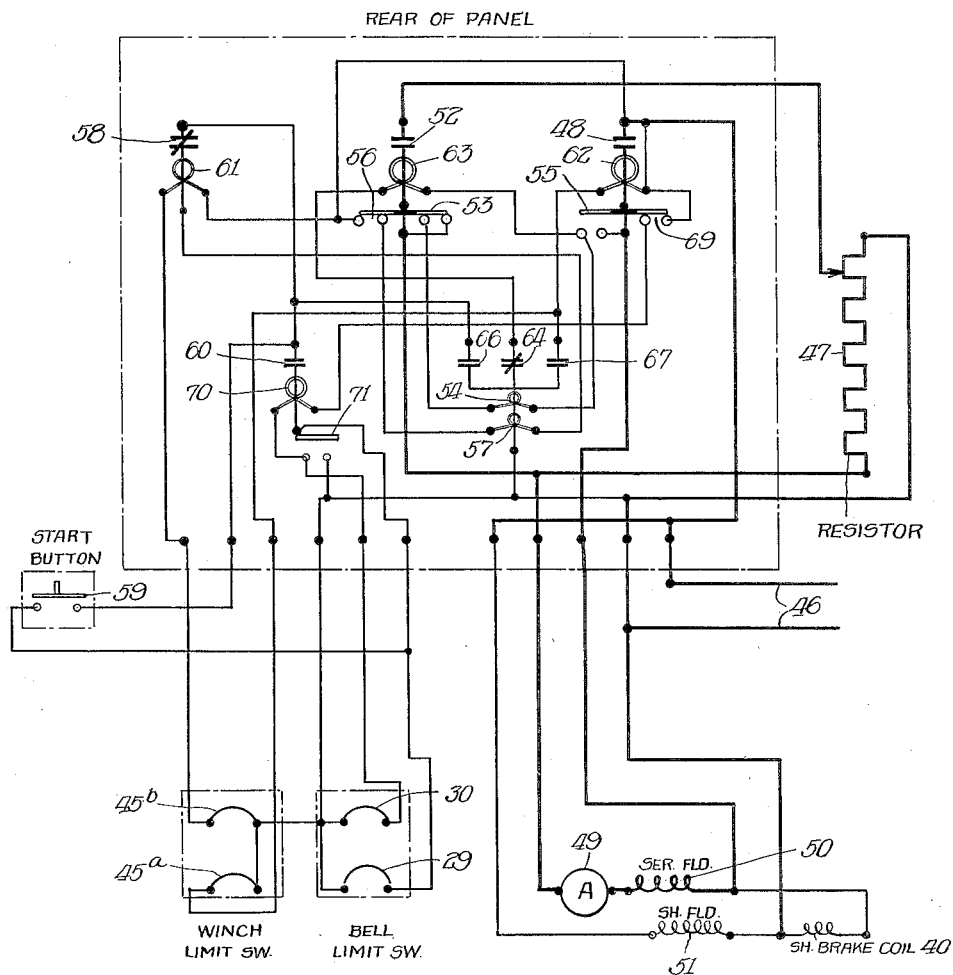

Patented Sept. 24, 1935

2,015,263

UNITED STATES PATENT OFFICE 2,015,263

STOCK LINE RECORDER

Gordon Fox and Arthur J. Whitcomb, Chicago, Ill., assignors to Freyn Engineering Company, Chicago, Ill., a corporation of Maine Application September 24, 1928, Serial No. 308,116

14 Claims. (Cl. 33—125)

The present invention relates to improvements in stock line recorders.

More particularly the present invention relates to means for indicating the level of material within a receptacle, such for example as a blast furnace. The present invention has been illustrated and will be described with particular reference to a blast furnace, though as the description proceeds it will be clear that the invention in its broader aspects is applicable to other types of indicators.

An object of the present invention is to provide an indicator which involves only relatively simple parts, which may be purchased in the open market, and which is sturdy and not likely to get out of order.

A further object is to provide an indicator which involves a weighted member which may be controlled by a cable, which indicator with a minimum of simple parts will allow said weighted member to descend until an indication of level is had, after which said weighted member will be drawn up at once.

A further object is to provide a simple stock indicator for a blast furnace which will cooperate with the charging means for said furnace whereby to insure that the usual try or test rod will be held in such a position while the furnace is being charged that the danger of the try or test rod being buried is avoided.

Further objects will appear as the description proceeds.

Referring to the drawings—

Figure 1 is a more or less diagrammatic view illustrating the principles of the present invention;

Figure 2 is a schematic layout of the electric circuits which may be utilized in the practice of the present invention; and Figure 3 is another layout corresponding to the layout shown in Figure 2, but showing the circuits as they have been actually applied in service to a control panel.

Referring first to Figure 1, the numeral 10 indicates a receptacle which is embodied in a blast furnace. Said blast furnace 10 is provided with the charging bell 11, which may be controlled by the cable 12. Said cable 12 is controlled by the lever 13, said lever in turn being controlled by the cable 14. The cable 14 passes over the sheave 15 and is connected to an operating member adapted to exert a downward pull upon said cable 14. The particular operating member chosen for illustration comprises the cylinder 16, adapted to have a movement of reciprocation along a vertical axis. Said cylinder is weighted by means of weight members 17—17. Disposed within the cylinder 16 is the relatively stationary piston 18, provided with the internal bore 19. Said cylinder is open to the atmosphere below the piston 18. Said bore 19 communicates with the pipe 20, adapted to carry liquid to said bore 19 and to deliver liquid from said bore 19. The pipe 20 is connected to the pump 21, which is of the reversible type. The pump 21, which is illustrated as being a rotary pump, is driven by the dynamo-electric machine 22. The other side of the pump 21 is connected to the pipe 23, which leads to the lower portion of the reservoir 24. The upper portion of the reservoir 24 is connected to the pipe 20 through the pipe 25, the relief valve 26 being provided in the pipe 25. The particular operating means for exerting the pull upon the cable 14 forms no part of the present invention and need not be described in detail. Means suitable for the purpose are described and claimed in the patent to Gordon Fox, No. 1,760,637, dated May 27, 1930. It will be sufficient to state in connection with the present application that the dynamo-electric machine 22 is adapted to operate with motoring functions to drive the pump 21 in a direction to deliver liquid from the reservoir 24 to the pipe 20, which liquid will exert a lifting force upon the weighted cylinder 16 to allow the charging bell 11 to drop by gravity, whereby to deposit its burden within the blast furnace 10. After the burden has been discharged from the charging bell 11, the cylinder will be allowed to descend, forcing liquid back through the pump 21, which, being reversible, will drive the dynamo-electric machine 22 with generating functions. The dynamo-electric machine 22 may be provided with a dynamic braking circuit, whereby to allow the bell 12 to close in a safe manner. The liquid discharged through the pump 21 will, of course, be returned to the reservoir 24. By reason of the relief valve 26, the dynamo-electric machine 22 and pump 21 may operate in a pumping sense to maintain a pressure to hold up the cylinder 16 and to hold the charging bell 11 in open position, said relief valve, when a sufficient pressure has been built up, opening to by-pass liquid through the pipe 25 and relief valve 26 to the reservoir 24. It may also be desired to utilize the functions of the relief valve 26 to give a time delay for dumping of the charging bell 11, said bell remaining in open position during the period of excess pressure just referred to. Moreover, the relief valve permits holding the bell 11 open for inspection or cleaning after dumping has been completed. The movable cylinder 16 is provided with an operating member 27 adapted to control a limit switch, indicated as a whole by the numeral 28. Said limit switch 28 is provided with the normally open pole 29 and the normally closed pole 30. When the cylinder 16 is in its lowered position, as indicated in Figure 1, the normally open pole 29 will be held in closed position. At this time the normally closed pole 30 will be open. When the cylinder 16 is out of its lowered position, the normally open pole 29 will be open and the normally closed pole 30 will be closed. The electrical circuits involving the poles 29 and 30 of the limit switch 28 will be referred to further hereinafter.

The numeral 31 indicates a try or test rod, which may be guided by any preferred guide means for constraining said try rod to move in a vertical line. Only one try rod has been illustrated, but it will be understood that a plurality of try rods may be provided at spaced regions within the blast furnace 10. The try rod 31 is connected to the cable 32, which rides upon sheaves 33—33. The other extremity of the cable 32 is connected to the grooved drum 34, which drum 34 has secured thereto the gear 35. A pinion 36 meshes with the gear 35, which pinion 36 is connected to the dynamo-electric machine 37. Also connected to the dynamo-electric machine 37 is the brake wheel 38, adapted to be controlled by the brake shoes 39. The brake shoes 39 are controlled by the shunt brake coil 40. Connected to the drum 34 is the shaft 41, which is provided with the worm 42 meshing with the worm wheel 43. Operation of the worm wheel 43 results in the actuation of the indicator 44. By reason of the fact that the indicator 44 is connected to the try rod 31, it will be clear that said indicator 44 will show the range of movement of said try rod 31.

The numeral 45 indicates a limit switch, which includes the switch contacts 45a and 45b. Said limit switch contact 45b closes after the limit switch contact 45a in the lowering of the test or try rod 31 and opens before the limit switch contact 45a in hoisting. Such limit switches are well known in the market and need not be described in detail. Figure 1 illustrates more or less schematically how the limit switch contacts 45a and 45b may be operated as the try rod is raised and lowered.

Reference may now be had to the schematic diagrams shown in Figures 2 and 3. For purposes of convenience, the schematic diagram shown in Figure 2 will be referred to particularly. The two sides of an electric circuit are indicated by the numerals 46—46. The dynamo-electric machine 37 is connected across said circuit through the plugging resistor 47 and the contactor 48, which contactor 48 is normally open. The dynamo-electric machine 37 includes the armature 49 and the series field winding 50. Also connected across the mains 46—46 is the shunt field winding 51 of the dynamo-electric machine 37. Connected across the series field winding, armature and resistor 47 of the dynamo-electric machine 37 is the shunt brake coil 40 above referred to. Connected across the resistor 47 is the normally open contactor 52. The amount of resistance controlled by said contactor 52 may be adjusted by means of an ordinary sliding contact. Connected across the series field winding 50 and the armature 49 of the dynamo-electric machine 37 is a circuit which includes a normally closed auxiliary contact 53 on contactor 52, the relay coil 54 and the normally open auxiliary contact 55, which operates synchronously with contactor 48. Connected across the mains 46—46 is a circuit including the normally closed auxiliary contact 56, which operates simultaneously with the contactor 52 and the auxiliary contact 53.

In series with said contact 56 is the voltage drop relay coil 57, the normally closed contactor 58, the start button 59 and the normally open pole 29 of limit switch 28. Said start button 59 is biased to open position. Bridged across the start button 59 is the normally open contactor 60. Also connected across the mains 46—46 is the operating coil 61 of contactor 58 and the normally closed limit switch contact 45b. Also connected across the mains 46—46 is the operating coil 62 of contactor 48 and the limit switch contact 45a. Connected to a point between contactor 48 and the series field winding 50 is a circuit which includes the normally open auxiliary contact 55 on contactor 48, operating coil 63 of contactor 52, relatively stationary contact 64 and switch blade 65. The switch blade 65 is connected to the other side of the system. The numerals 66 and 67 indicate relatively stationary contacts adapted to be engaged by the switch blade 65. When said switch blade 65 is thrown to the left as the parts are viewed in Figure 2 into engagement with the contacts 66 and 67, the start button 59 and the normally closed limit switch contact 45a are short-circuited. By this movement, also, circuit of operating coil 63 of contactor 52 is interrupted and a maintaining circuit is established, independently of the start button, for the coil 57. The switch blade 65 and relatively stationary contacts 64, 66 and 67 all constitute parts of a voltage drop relay, which is indicated as a whole by the numeral 68. Said relay 68 also includes the operating coils 54 and 57, which in Figure 2 are designated as the top coil and bottom coil, respectively, of said relay 68. The switch blade 65 is biased into engaging relationship with the relatively stationary contact 64.

Also connected across the mains 46—46 is a circuit including the normally closed auxiliary contact 69 on contactor 48, the operating coil 70 of contactor 60 and the normally closed pole 30 connected with the bell operating means. Bridged across the normally closed pole 30 is a circuit including the normally open auxiliary contact 71 on the normally open contactor 60.

A mode of operation of the above described embodiment of the present invention is substantially as follows: Assume conditions between dumpings of the bell 11 of the blast furnace. At this time the bell 11 is in its closed position, which means that the cylinder 16 is in its lowermost position, in which the operating member 27 holds the relay 28 in position to close the normally open pole 29 and to open the normally closed pole 30. At this time the try rod 31 is in its uppermost position, the brake 39 being biased to braking position. At this time both limit switch contacts 45a and 45b of the limit switch 45 are open. Under the conditions mentioned, that is—when the bell 11 is closed, it is possible to inaugurate the functions of the try rod 31 by operation of the start button 59, though when the bell 11 is open it is impossible to inaugurate the functions of the try rod 31. This fact will be evident from a consideration of Figures 2 and 3. Referring particularly to Figure 2, it will be noted that once normally open pole 29 is in open position, corresponding to an open position of the bell 11, operation of the start button 59 will not complete any circuit. Assuming, therefore, that the bell 11 is closed and that it is desired to make an observation independently of any interlock with the bell operating means, the start button 59 may be closed, completing circuit from the left-hand conductor 46, through normally closed contact 56, through voltage drop relay coil 57, through normally closed contactor 58, through start button 59, through the pole 29 (which is held closed when the bell 11 is closed), to the right-hand conductor 46. As a result of the energization of the coil 57, the blade 65 of the voltage drop relay 68 is moved into engagement with the contacts 66 and 67, bridging the start button 59 and the pole 29, which, as noted above, is closed at this time. A sustaining circuit is thereby formed for the voltage drop relay 68. Closure of the blade 65 of the voltage drop relay 68 connects contacts 66 and 67 and completes a circuit from the left-hand conductor 46 through the coil 62 of contactor 48, through stationary contact 67 and blade 65, to the right-hand conductor 46. Energization of coil 62 results in the closure of the normally open contactor 48. Closure of contactor 48 completes a circuit through the dynamoelectric machine 37 as follows: From the left-hand conductor 46, through contactor 48, series field winding 50, armature 49 and resistor 47, to the right-hand conductor 46. It will be noted that the shunt brake coil 40 is connected across the circuit including the series field winding 50, armature 49 and resistor 47. Said shunt brake coil 40 will therefore be energized to release the brake 39. The motor develops a torque tending to lift the try rod. However, the resistor 47 is chosen of such value as to limit the torque of said motor so that the weight of the try rod causes said try rod to descend in opposition to the torque exerted by said motor. As the drum 34 unwinds cable to permit the try rod 31 to lower, limit switch contact 45a is closed. Closure of this limit switch contact connects the coil 62 of contactor 48 directly across the line. This causes no action at this time. As the rotor of the motor 37 is rotated by reason of the weight of the try rod 31, a countervoltage is generated within said motor 37. Inasmuch as contact 53 is closed at this time and inasmuch as contact 55 was moved to closed position when the contactor 48 closed, this voltage is impressed on the coil 54 of the voltage drop relay 68 and causes said coil 54 to hold closed the blade 65 of said voltage drop relay 68, which blade, as noted above, had been moved into engagement with contacts 66 and 67 by reason of the energization of the coil 57 of said voltage drop relay 68.

After the drum 34 carrying the cable 32 has unwound a predetermined amount, limit switch contact 45b of the limit switch 45 will close, thereby completing a circuit from the left-hand conductor 46 (Figure 2), through coil 61, through contact 45b, to the right-hand conductor 46. Energization of coil 61 causes normally closed contactor 58 to open. Opening of the normally closed contactor 58 interrupts the circuit through the coil 57 of the voltage drop relay 68. The switch blade 65 of said voltage drop relay does not drop, however, due to the influence of the coil 54 of said voltage drop relay.

When the try rod 31 reaches the burden within the blast furnace, the torque developed upon the rotor of the motor by the weight of said try rod 31 on the cable becomes zero and the motor speed becomes zero. As a result, the countervoltage in the motor becomes zero and coil 54 releases the switch blade 65, causing said switch blade 65 to move out of engagement with contacts 66 and 67 into engagement with contact 64.

It will be noted that prior to the movement immediately above referred to of the switch blade 65 out of engagement with contacts 66 and 67, circuit through the coil 62 of contactor 48 was completed in parallel paths, one of which included the limit switch contact 45a and the other of which included the switch blade 65, which, as noted above, is connected to the right-hand conductor 46. Therefore, movement of the switch blade 65 out of engagement with contacts 66 and 67 puts the energization of coil 62 wholly under control of limit switch contact 45a.

Moreover, movement of switch blade 65 of the voltage drop relay 68 completes a circuit from the left-hand conductor 46, through contactor 48, through the normally open auxiliary contact 55 (closed at this time by reason of the closure of contactor 48), through operating coil 63 of contactor 52, stationary contact 64 and switch blade 65, to the right-hand conductor 46. Energization of the operating coil 63 causes normally open contactor 52 to close, short-circuiting at least a part of the resistor 47, causing the motor 37 to hoist the try rod 31.

Closure of contactor 52 opens the normally closed auxiliary contact 53, which action interrupts the circuit through the coil 54 of the voltage drop relay 68, thereby preventing said coil from actuating said voltage drop relay 68 during the ascent of the try rod 31. Closure of contactor 52 also opens the normally closed auxiliary contact 56, which action interrupts the circuit through the coil 57 of the voltage drop relay 68, thereby rendering the voltage drop relay ineffective during the ascent of the try rod.

When the try rod 31 approaches the top of the furnace the limit switch contact 45b of the limit switch 45 opens, thereby interrupting circuit through operating coil 61 of contactor 58, causing the normally closed contactor 58 to close. This causes no action at this time. When the try rod 31 reaches the top of the furnace, the limit switch contact 45a of the limit switch 45 opens, thereby interrupting the circuit through the coil 62 of contactor 48, causing contactor 48 to open, which in turn deenergizes coil 63, causing contactor 52 to open. The net result is that power is cut off from the motor 37 and the shunt brake coil 40 is deenergized, resulting in the setting of the brake 39. Opening of contactor 52 closes the two normally closed auxiliary contacts 53 and 56, thereby rendering the circuits through the operating coils 54 and 57 of the voltage drop relay 68 effective for the next descent of the try rod.

The interlocking relationship between the bell operating means and the try rod operating means will now be referred to. With the bell operating cylinder 16 in its lowermost position corresponding to the closed position of the bell 11, normally open pole 29 of the limit switch 28 is closed, but contactor 60 is open. When the cylinder 16 rises in response to energization of the motor 22, the normally closed pole 30 of the limit switch 28 is closed, which completes a circuit from the left-hand conductor 46, through the normally closed auxiliary contact 69, through coil 70 of contactor 60, through pole 30, to the right-hand conductor 46. Energization of coil 70 results in the closure of the contactor 60, which results in the closure of the auxiliary contact 71 on said contactor 60. Closure of the auxiliary contact 71 by-passes the pole 30 of the limit switch 28. When the bell cylinder 16 has gone through its cycle of movement and has returned to its lowermost position, the normally open pole 29 of the limit switch 28 is closed. Circuit is thereby completed from the left-hand conductor 46, through normally closed auxiliary contact 56, through coil 57 of voltage drop relay 68, through normally closed contactor 58, through contactor 60, through pole 29 of limit switch 28, to the right-hand conductor 46. Energization of the coil 57 causes operation of the voltage drop relay 68, which causes operation of the dynamo-electric machine 37 in the manner above described.

It will be observed that the present invention provides a system in which the stock indicator, or stock line recorder, is interlocked with the charging bell operating means of the blast furnace, in which system the weighted indicating member is allowed to descend (under the influence of the dynamo-electric machine, which tends to develop a retarding action), until it strikes the burden, after which the weighted indicating member is immediately lifted in response to cessation in the countervoltage developed in said dynamo-electric machine during the descent of said try rod.

Though a preferred embodiment of the present invention has been described in detail, many modifications will occur to those skilled in the art. It is intended to cover all such modifications that fall within the scope of the appended claims.

What is claimed is—

1. In combination, a suspended test member, electric mains, an electric motor adapted to be connected to said mains, power transmitting means between said motor and said test member, for raising said test member, brake means for said motor biased to braking relationship with said motor, electrical control means controlling said brake means for controlling the dropping of said test member, means for controlling the voltage impressed upon said motor from said mains while the rotor of said motor is being driven due to the dropping of said test member, and means responsive to changes in the generating functions of said motor for controlling said voltage controlling means.

2. In combination, a suspended test member, a dynamo-electric machine, power transmitting means between said machine and said test member, electric mains for supplying current to said dynamo-electric machine for raising said test member through said power transmitting means, brake means for said dynamo-electric machine biased to braking relationship with said dynamo-electric machine, electric control means for said brake means for controlling the dropping of said test member, a resistance adapted to be connected in circuit with said dynamo-electric machine across said mains for controlling the E. M. F. impressed upon said dynamo-electric machine by said mains, and means responsive to changes in the generating functions of said dynamo-electric machine for causing said dynamo-electric machine to raise said test member to a predetermined position.

3. In combination, a suspended test member, electric mains, a dynamo-electric machine adapted to be connected to said mains, power transmitting means between said dynamo-electric machine and said test member for lifting said test member, electrical control means for said machine for limiting the extent to which said machine may raise said test member, means for limiting the E. M. F. impressed upon said machine by said mains when said machine is operated as a generator by the dropping of said test member, and means responsive to changes in the generating functions of said machine for controlling said E. M. F. limiting means.

4. A level indicator comprising, in combination, a suspended test member, electric mains, a dynamo-electric machine adapted to be connected across said mains, hoisting mechanism for said test member, said hoisting mechanism being connected to said dynamo-electric machine, a brake for said hoisting mechanism for holding said test member in raised position, a starting switch biased to open position, electrical control means responsive to the momentary closure of said starting switch, said electrical control means including means for releasing said brake to permit the lowering of said test member, said electrical control means also including a plugging resistance in circuit with said dynamo-electric machine, means responsive to changes in the E. M. F. developed by said dynamo-electric machine as a generator for modifying said plugging resistance to enable said dynamo-electric machine to lift said test member through said hoisting mechanism.

5. In combination, electric mains, a suspended test member, a dynamo-electric machine adapted to be connected across said mains, hoisting mechanism for said test member, said hoisting mechanism being connected to said dynamo-electric machine, a brake for said hoisting mechanism for holding said test member in raised position, a starting switch biased to open position, electrical control means responsive to the momentary closure of said starting switch for releasing said brake to permit the lowering of said test member, said electrical control means including means for limiting the E. M. F. impressed upon said dynamo-electric machine by said mains when said machine is operating as a generator during the lowering of said test member, said electrical control means also including means for modifying the effect of said E. M. F. limiting means, said last mentioned means being responsive to the operation of said dynamo-electric machine as a generator.

6. In combination, a pair of electric mains, a suspended test member, an electrical motor, power transmitting means between said motor and said test member for raising said test member, electrical control means for controlling the dropping of said test member to operate said motor as a generator, a plugging resistance for said motor, a shunt circuit for said plugging resistance, a voltage drop relay for controlling said shunt circuit, said voltage drop relay being responsive to changes in the generating functions of said motor while being operated as a generator by said test member.

7. In combination, a suspended test member, electric mains, an electric motor adapted to be connected to said mains, power transmitting means between said motor and said test member for raising said test member, a resistance in circuit with said motor for controlling the voltage impressed upon said motor by said mains, and means responsive to changes in the generating functions of said motor when said motor is being operated with generating functions by said test member for controlling the effectiveness of said resistance.

8. A level indicator comprising, in combination, a weighted test member, electric mains, a dynamo-electric machine adapted to be connected across said mains, hoisting mechanism for said test member, said hoisting mechanism being connected to said dynamo-electric machine, electrical control means including a plugging resistance in circuit with said dynamo-electric machine, and means responsive to changes in the E. M. F. developed by said dynamo-electric machine as a generator for modifying said plugging resistance to enable said dynamo-electric machine to lift said test member through said hoisting mechanism.

9. In combination, electric mains, a weighted test member, a dynamo-electric machine adapted to be connected across said mains, hoisting mechanism for said test member, said hoisting mechanism being connected to said dynamo-electric machine, electrical control means including means for limiting the E. M. F. impressed upon said dynamo-electric machine by said mains when said machine is operating as a generator during the lowering of said test member, said electrical control means also including means for modifying the effect of said E. M. F. limiting means, said last mentioned means being responsive to the E. M. F. of said dynamo-electric machine when operating as a generator.

10. In combination, electric mains, a suspended test member, a dynamo-electric machine adapted to be connected across said mains, hoisting mechanism for said test member, said hoisting mechanism being connected to said dynamo-electric machine, a resistance connected in circuit with said dynamo-electric machine for limiting the E. M. F. impressed upon said dynamo-electric machine by said mains when said machine is operating as a generator during the lowering of said test member, and means for modifying the effect of said resistance, said means being responsive to the E. M. F. of said dynamo-electric machine when operating as a generator.

11. In combination, electric mains, a weighted test member, a dynamo-electric machine, power transmitting means between said test member and said dynamo-electric machine, a resistor connecting said dynamo-electric machine across said mains, said resistor having the function of limiting the E. M. F. impressed upon said dynamo-electric machine by said mains to a value such that the weight of said test member overbalances the torque developed by said dynamo-electric machine whereby said test member may drive said dynamo-electric machine as a generator through said power transmitting means, and means responsive to the counter-voltage set up by said dynamo-electric machine under generating functions for modifying the effect of said resistor.

12. In combination, a suspended test member, electric mains, an electric motor, power transmitting means between said motor and said test member, said motor being adapted to be connected to said mains for raising said test member through said power transmitting means, a resistance in circuit with said motor adapted to modify the E. M. F. impressed upon said motor by said mains, said motor having a series field winding and an armature, a control circuit across said series field winding and said armature whereby to be responsive to the counter E. M. F. of said motor and means responsive to said control circuit for controlling said resistance.

13. In combination, a suspended test member, electric mains, an electric motor, power transmitting means between said motor and said test member, said motor being adapted to be connected to said mains for raising said test member through said power transmitting means, a control circuit connected across the armature of said motor whereby to be responsive to the counter E. M. F. of said motor, and means responsive to said control circuit for modifying the E. M. F. impressed upon said motor by said mains.

14. In combination, a suspended test member, electric mains, an electric motor, power transmitting means between said motor and said test member, said motor being adapted to be connected to said mains for raising said test member through said power transmitting means, a resistance in circuit with said motor adapted to modify the E. M. F. impressed upon said motor by said mains, a control circuit across the armature of said motor whereby to be responsive to the counter E. M. F. of said motor, and means responsive to said control circuit for controlling said resistance.

GORDON FOX.
ARTHUR J. WHITCOMB.